US009331564B2

(12) United States Patent
Lehmann

(10) Patent No.: US 9,331,564 B2
(45) Date of Patent: May 3, 2016

(54) CONNECTING A PHOTOVOLTAIC ARRAY AT A HIGH OPEN CIRCUIT VOLTAGE

(75) Inventor: Reinhard Lehmann, Kassel (DE)

(73) Assignee: SMA SOLAR TECHNOLOGY AG, Niestetal (DE)

( * ) Notice: Subject to any disclaimer, the term of this patent is extended or adjusted under 35 U.S.C. 154(b) by 1015 days.

(21) Appl. No.: 13/479,488

(22) Filed: May 24, 2012

(65) Prior Publication Data

US 2012/0228951 A1 Sep. 13, 2012

Related U.S. Application Data

(63) Continuation of application No. PCT/EP2010/068086, filed on Nov. 24, 2010.

(30) Foreign Application Priority Data

Nov. 24, 2009 (EP) .................................. 09176900

(51) Int. Cl.
*H02J 3/00* (2006.01)
*H02M 1/36* (2007.01)
*H02J 3/38* (2006.01)

(52) U.S. Cl.
CPC *H02M 1/36* (2013.01); *H02J 3/383* (2013.01); *Y02E 10/563* (2013.01); *Y10T 307/724* (2015.04)

(58) Field of Classification Search
USPC ..................................................... 307/151, 72
See application file for complete search history.

(56) References Cited

U.S. PATENT DOCUMENTS

| 6,128,204 A * | 10/2000 | Munro et al. ................... 363/41 |
| 7,924,592 B2 | 4/2011 | Kang et al. |
| 8,253,273 B2 * | 8/2012 | Fredette et al. ................. 307/64 |
| 2005/0088868 A1 | 4/2005 | Ryan et al. |
| 2005/0231172 A1 | 10/2005 | Kato et al. |
| 2006/0023478 A1 | 2/2006 | Takeda et al. |
| 2009/0167086 A1 | 7/2009 | Seymour |
| 2010/0308662 A1 * | 12/2010 | Schatz et al. .................... 307/80 |
| 2012/0026769 A1 * | 2/2012 | Schroeder ............... H02J 3/383 363/131 |

FOREIGN PATENT DOCUMENTS

| CN | 2891473 Y | 4/2007 |
| DE | 10105892 A1 | 9/2002 |
| DE | 202006001063 U1 | 6/2006 |
| EP | 1463188 A2 | 9/2004 |
| EP | 1914857 A1 | 4/2008 |

(Continued)

OTHER PUBLICATIONS

International Search Report dated Nov. 10, 2011 for application No. PCT/EP2010/068086.

(Continued)

*Primary Examiner* — Fritz M Fleming
*Assistant Examiner* — Dru Parries
(74) *Attorney, Agent, or Firm* — Eschweiler & Associates, LLC

(57) ABSTRACT

For connecting a PV array via an inverter to an AC power grid, at first a DC link at the input side of the inverter is pre-charged from the AC power grid. A link voltage of the DC link is adjusted to a pre-set value with the inverter connected to the AC power grid, the pre-set value being lower than an open circuit voltage of the PV array, and then the PV array at its open circuit voltage is directly connected to the DC link, while the link voltage is continuously adjusted to the pre-set value.

18 Claims, 2 Drawing Sheets

(56) References Cited

FOREIGN PATENT DOCUMENTS

| | | | |
|---|---|---|---|
| JP | 11312022 | A | 11/1999 |
| JP | 2002142383 | A | 5/2002 |
| JP | 2004357390 | A | 12/2004 |

OTHER PUBLICATIONS

John Wiles; "The Nature of the PV Module: Limited Currents Have Benefits and Drawbacks"; IAEI News Sep.-Oct. 2007, www.iaei.org, pp. 26-30.

* cited by examiner

CONNECTING A PHOTOVOLTAIC ARRAY AT A HIGH OPEN CIRCUIT VOLTAGE

CROSS REFERENCE TO RELATED APPLICATIONS

This application is a continuation of International Application No. PCT/EP2010/068086, filed on Nov. 24, 2010, which claims priority to co-pending European Patent Application No. EP 09 176 900.0 entitled "Zuschalten eines Photovoltaikfeldes mit hoher Leerlaufspannung", filed Nov. 24, 2009.

FIELD

The present invention generally relates to a method of connecting a photovoltaic (PV) array to an AC power grid via an inverter. More particularly, the present invention relates to a method of connecting a PV array to an AC power grid via an inverter including a DC link at its input side, in which the input DC link of the inverter is pre-charged from the AC power grid.

Further, the present invention generally relates to an apparatus for feeding electric energy from a PV array into an AC power grid, and more particularly to an apparatus for feeding electric energy from a PV array into an AC power grid, wherein the apparatus comprises an inverter, a DC link at the input side of the inverter, a voltage control unit for a link voltage of the DC link, at least one switch for connecting the PV array to the DC link, and at least one mains switch for connecting the inverter to the AC power grid.

BACKGROUND

Caution is demanded when connecting a photovoltaic array to an AC power grid via an inverter to avoid the occurrence of excessive currents through the circuitry components used and to avoid the occurrence of excessive voltages over the circuitry components used. The danger of overloading these components may, in principle, be eliminated by a higher voltage class or higher current class of the components. This approach normally, however, results in extreme cost increases and in power losses due to the lower efficiency of the higher voltage class components. Thus, methods and apparatuses are preferred that avoid high loads at the circuitry components upon connecting the photovoltaic array to the AC power grid.

This particularly applies in context with a development towards higher output voltages of photovoltaic arrays in order to be able to transfer higher electric power without a need for increasing the cable cross-section. Such higher output voltages of the photovoltaic arrays in normal operation go along with even higher open circuit voltages of the photovoltaic arrays. These open circuit voltages may readily exceed the permissible voltage across the inverter bridge of the respective inverter.

From DE 20 2006 001 063 U1 it is known to have a DC/DC converter, like for example a buck converter, preceding the inverter bridge of an inverter, the DC/DC converter providing a voltage adaptation between the photovoltaic array and the inverter. The buck converter, however, increases the complexity of the apparatus. It also causes additional power loss. DE 20 2006 001 063 U1 does not deal with connecting the photovoltaic array at high open circuit voltages to the inverter. It would be possible to avoid loading the inverter bridge with the full open circuit voltage of the photovoltaic array by dedicated operation of a buck converter preceding an inverter; however, the additional power loss caused by the buck converter during normal operation would remain, unless it was bridged in the current path by further means when the open circuit voltage has reduced to the output voltage that occurs during the normal operation of the photovoltaic array.

From JP 11312022 A it is known to protect the inverter bridge of an inverter from high open circuit voltages of a connected photovoltaic array by means of a voltage divider realized by a resistor arranged in one of the connection lines and a resistor connected in parallel to the inverter bridge. By shortening the resistor in the connection line and switching off the resistor connected in parallel to the inverter bridge, the voltage divider is disabled in normal operation, thus avoiding continued losses due to the resistors. The voltage divider involves an additional effort, particularly for switching it off in normal operation.

Inverters for feeding electric energy from photovoltaic arrays typically have a voltage control unit for a DC link in order to allow for the execution of a so-called Maximum Power Point (MPP)-tracking. In MPP-tracking the output voltage of the photovoltaic array is adjusted via the voltage of the DC link to a value at which the photovoltaic array yields a maximum electric power in view of actual operation conditions.

US 2009/0167097 A1 discloses a photovoltaic inverter interface between a photovoltaic array and an inverter. During a start-up process, a DC link of the inverter is pre-charged to the operating voltage of the inverter using soft start switch gear or the photovoltaic array. The inverter is then turned on while a contactor switch in one of the connection lines of the photovoltaic array is still open. Before the photovoltaic array is connected to the DC link of the inverter by closing the contactor switch, it is deliberately shorted by a shunt switch to reduce the output voltage from open circuit voltage to the output voltage under normal operation conditions.

There still is a need for a method of connecting a photovoltaic array to an AC power grid via an inverter, and for an apparatus feeding electric energy from a photovoltaic array into an AC power grid, the method and the inverter being able to cope with the problem of a high open circuit voltage of the photovoltaic array while at the same time keeping the technological complexity low.

SUMMARY

In one aspect, the present invention relates to a method of connecting a PV array to an AC power grid via an inverter including a DC link at its input side. This method comprises the steps of: pre-charging the input DC link of the inverter from the AC power grid, adjusting a link voltage of the DC link to a pre-set value by means of the inverter connected to the AC power grid, the pre-set value being lower than an open circuit voltage of the PV array, and connecting the PV array to the DC link, while continuously executing the step of adjusting. In the step of connecting, the PV array at its open circuit voltage is directly connected to the DC link.

In another aspect, the present invention relates to an apparatus for feeding electric energy from a PV array into an AC power grid. This apparatus comprises an inverter, a DC link at the input side of the inverter, a voltage control unit for a link voltage of the DC link, at least one switch for connecting the PV array to the DC link, at least one mains switch for connecting the inverter to the AC power grid, and a connection controller for connecting the PV array to the AC power grid via the inverter. The connection controller at first closes the mains switch, then activates the voltage control unit for the link voltage to adjust the link voltage to a pre-set value that is lower than an open circuit voltage of the PV array, and afterwards closes the switch for connecting the PV array, such that the PV array at its open circuit voltage is directly connected to the DC link, while the voltage control unit is continuously adjusting the link voltage to the pre-set value.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
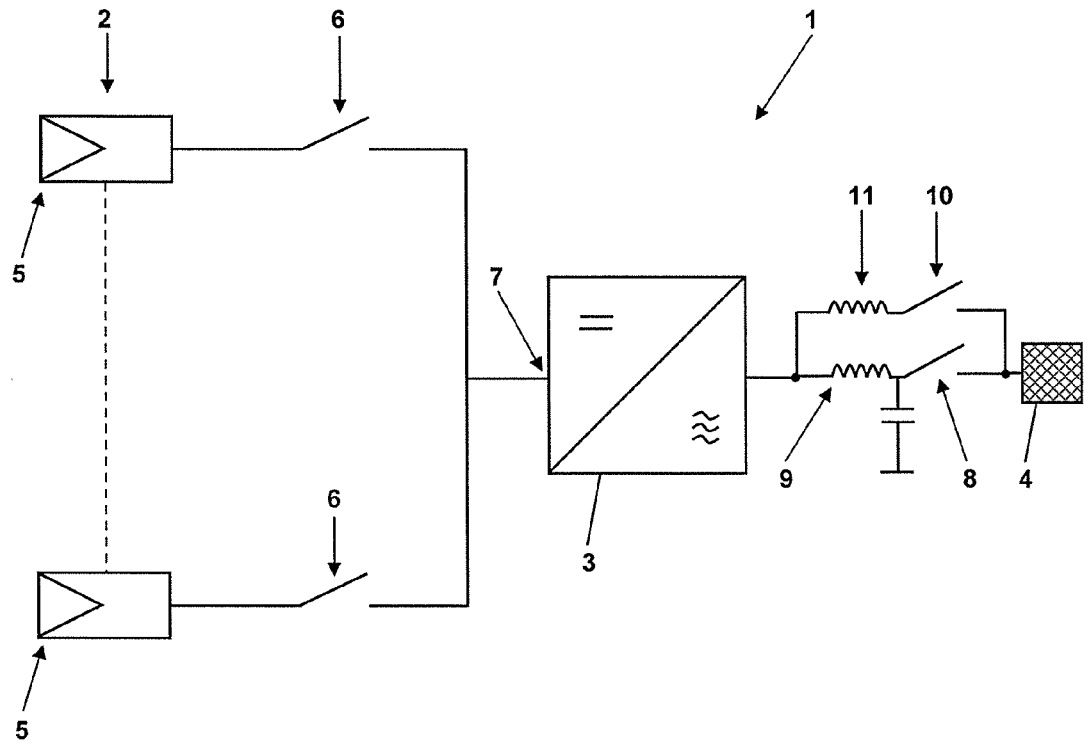
FIG. 1 is a single-line diagram of an apparatus according to the invention.

In the method of connecting a photovoltaic array to an AC power grid via an inverter according to the present invention, a DC link at the input side of the inverter is pre-charged from the AC power grid. The link voltage of the DC link is adjusted to a pre-set value by the inverter connected to the AC power grid at least towards the end of the step of pre-charging. The PV array is then connected to the DC link, the link voltage of which is still continuously adjusted to the pre-set value. That connection is done without having previously adapted or at the same time adapting the open circuit voltage of the PV array to the link voltage. Existing differences in the voltages are bridged in a hard manner. This has, however, no negative impact since the resulting charges flowing from the PV array are limited and since they are absorbed on the one hand by the buffer capacity of the DC link, and on the other hand by the inverter that is already active and feeds the current into the AC power grid. The voltage control unit for the link voltage of existing and commercially available inverters proves to be sufficiently fast for changing the direction of power flow from the direction for pre-charging into the direction for feeding after the PV array has been connected, this way preventing an increase of the link voltage before it reaches a critical level. Also, when implementing the new method, the existing capacity of the DC link is sufficient and does not need to be increased to avoid critical rising of voltages upon connecting the PV array.

This applies even if the value the link voltage is adjusted to according to the invention is set much lower than the open circuit voltage of the PV array, i.e., even with an open circuit voltage of the PV array that is distinctly above the output voltage of the PV array during normal operation and with a link voltage adjusted to the value of this lower output voltage. Even if the maximum open circuit voltage of the PV array is applied directly, i.e., without any previous voltage adaptation between the PV array and the DC link, to the DC link having the link voltage adjusted to the pre-set value, the new method does not result in a critical increase of the link voltage. Thus, no DC/DC converter for voltage adaptation between the PV array and the DC link is necessary.

As already noted, in the method of the invention the value the link voltage is adjusted to prior to connecting the PV array corresponds in one embodiment to a normal output voltage of the PV array in normal operation of the PV array and is, thus, regularly higher than a peak voltage of the AC power grid. Surprisingly, the voltage control units that are, e.g., used for MPP-tracking in existing and commercially available inverters are able to adjust the link voltage, by taking electric energy out of the AC power grid, to a value that is even above the peak voltage of the AC power grid. To this end, the inductors that are, as a rule, provided between the inverter bridge of the inverter and the AC power grid are used by the voltage control units like in a boost converter. By means of adjusting the link voltage to a value above the peak voltage of the AC power grid, the control unit for the link voltage has a stable operating point, in which feeding electric energy into the AC power grid and, thus, discharging the DC link is possible immediately after connecting the PV array.

In order to limit an increase of the link voltage to non-critical levels even with a small capacity in the DC link and even with a slowly reacting voltage control unit for the link voltage, the PV array may be divided into segments that are connected to the DC link one after the other while the link voltage is adjusted to the pre-set value. In this way the charge that may flow into the DC link upon connecting the respective segment to the DC link, and, thus, the increase of the link voltage that is possible, are delimited further.

The new method comprises two steps of (i) adjusting the link voltage to the pre-set value, and (ii) connecting the PV array to the DC link while the link voltage is adjusted to the pre-set value. In one embodiment the first step (i) is subdivided into a first passive pre-charging step for the DC link, wherein this step immediately follows after the inverter has been connected to the AC power grid, and into a subsequent active pre-charging step, in which the switches of the inverter are clocked in such a way that the link voltage is boosted to above the peak voltage of the AC power grid. In the first sub-step, i.e., the passive pre-charging step, a charging current flowing from the AC power grid into the DC link may be rectified by means of free-wheeling diodes of an inverter bridge of the inverter in order to preliminarily pre-charge the DC link. During this passive pre-charging step, all switches of the inverter bridge are open. The charging current that flows when beginning to pre-charge the link may get too high if it is not systematically limited by means of, e.g., a choke or a resistor. As a rule, the inherent resistors and a grid choke of the inverter and/or the impedance of an EMC-filter at the output of the inverter are all inadequate to this end. Thus, in one embodiment the charging current for preliminarily pre-charging the DC link is lead through a bypass that is installed in parallel to a mains switch and in which a current delimiting device is arranged. Alternatively, or additionally, a transformer for upward converting the voltage of the AC power grid may be provided in the bypass in order to already pre-charge the DC link to a link voltage above the peak voltage of the AC power grid. If this first passive pre-charging step has been completed, the inverter is connected to the grid via the common mains switch, and then the bypass is interrupted. At this point in time the voltage control unit for adjusting the link voltage to the pre-set value is also activated. In one embodiment the voltage control unit for the link voltage comprises the same device and measures that are used in known and commercially available inverters for MPP-tracking, with the only exception that in the active second sub-step of the first step (i) and during the second step (ii) of the new method a fixed value is pre-set for the link voltage.

The second step (ii) of the new method may be subdivided, as needed, into sub-steps of connecting individual segments of the PV array. As soon as the entire PV array is connected, the control unit for the link voltage may be allocated to adjust the link voltage to a variable value that is determined by MPP-tracking instead of by a fixed value.

In case that the link voltage when using the new method should still increase to an undesirably high value that would endanger the integrity of the inverter, operation of the inverter may be stopped from a critical voltage on in order to avoid damages. The PV array is then immediately disconnected from the inverter. When the link voltage has reduced to a non-critical level by means of commonly implemented de-charging devices for the capacity of the DC link, a new trial for connecting the PV array while adjusting the link voltage to the pre-set value may be carried out.

The apparatus according to the invention comprises a connection controller that at first closes the mains switch for connecting the inverter to the AC power grid, then activates the control unit for the link voltage to adjust the link voltage to a pre-set value, and only after that closes the switch for connecting the PV array. As already indicated above, the mains switch may include several switches for providing parallel current paths, e.g., a first switch for at first connecting the inverter to the AC power grid via a current delimiting device, and a second switch for later on directly connecting the inverter to the AC power grid, when the current delimiting device, which dissipates power, is no longer needed. Also, the switch for connecting the PV array may be subdivided into a plurality of partial switches, each connecting only a segment of the PV array to the inverter.

In the new apparatus, the switches of the inverter bridge may have a permissible working voltage that is lower than the open circuit voltage of the PV array, and may, thus, both be cheaper and dissipating less power than switches having a higher permissible working voltage.

Upstream of the inverter bridge, particularly between the switch for connecting the PV array to the inverter bridge, the inverter of the new apparatus may have only the DC link in one embodiment. That means, a DC/DC converter for voltage adaptation neither needs to be provided upstream nor downstream of the switch for connecting the PV array to the inverter. In one embodiment such DC-DC converters are missing completely in the new apparatus to save the related effort and to avoid the related power loss.

Further details of the new apparatus have already been explained in context with the method according to the invention.

Figure 2:
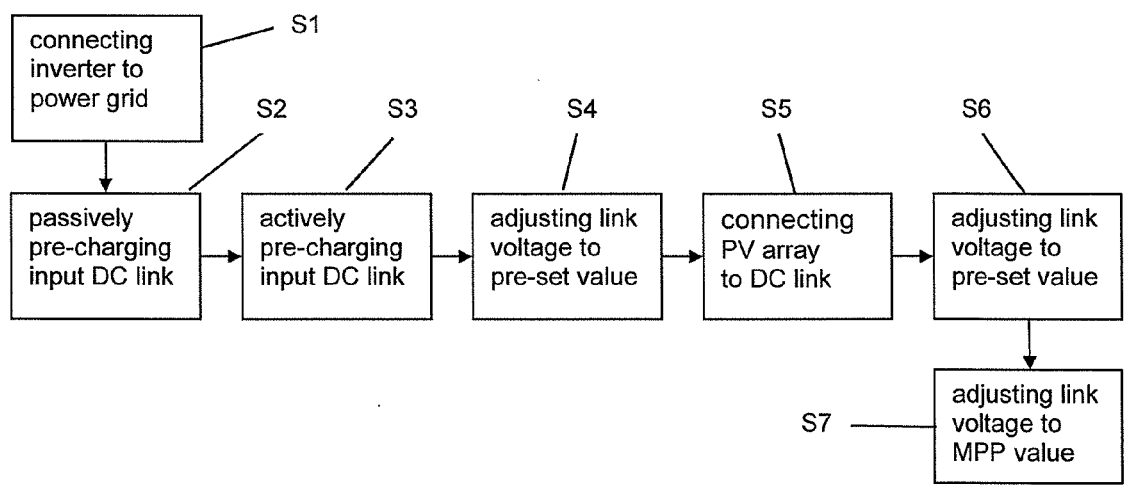
FIG. 2 is a block diagram of an embodiment of a method according to the invention.

Referring now in greater detail to the drawings, FIG. 1 illustrates an apparatus 1 that serves for connecting a PV array 2 to an AC power grid 4 via an inverter 3. The PV array 2 is divided into separate segments 5, which may be separately connected, each via a separate switch 6, to a DC link 7 (not graphically distinguished here), which is the input link of the inverter 3. At its output, the inverter 3 is connectable to the AC power grid 4 via a mains switch 8. An EMC filter 9 is provided between the mains switch 8 and the inverter 3. An auxiliary mains switch 10 is provided in parallel to the mains switch and the EMC filter 9. A choke 11 having much higher impedance than the EMC filter 9 is connected in series with the auxiliary mains switch 10. The problem the present invention addresses is that the PV array 2 and each of its segments 5 has a higher open circuit voltage than it would be compatible with the inverter 3. The output voltage of the PV array 2 and its segments 5 in normal operation, i.e., the output voltage when current is fed into the AC power grid 4, however, is harmless to the inverter 3. In order to safely connect the PV array 2 to the inverter 3 under these conditions the following steps as shown in FIG. 2 are taken.

Figure 3:
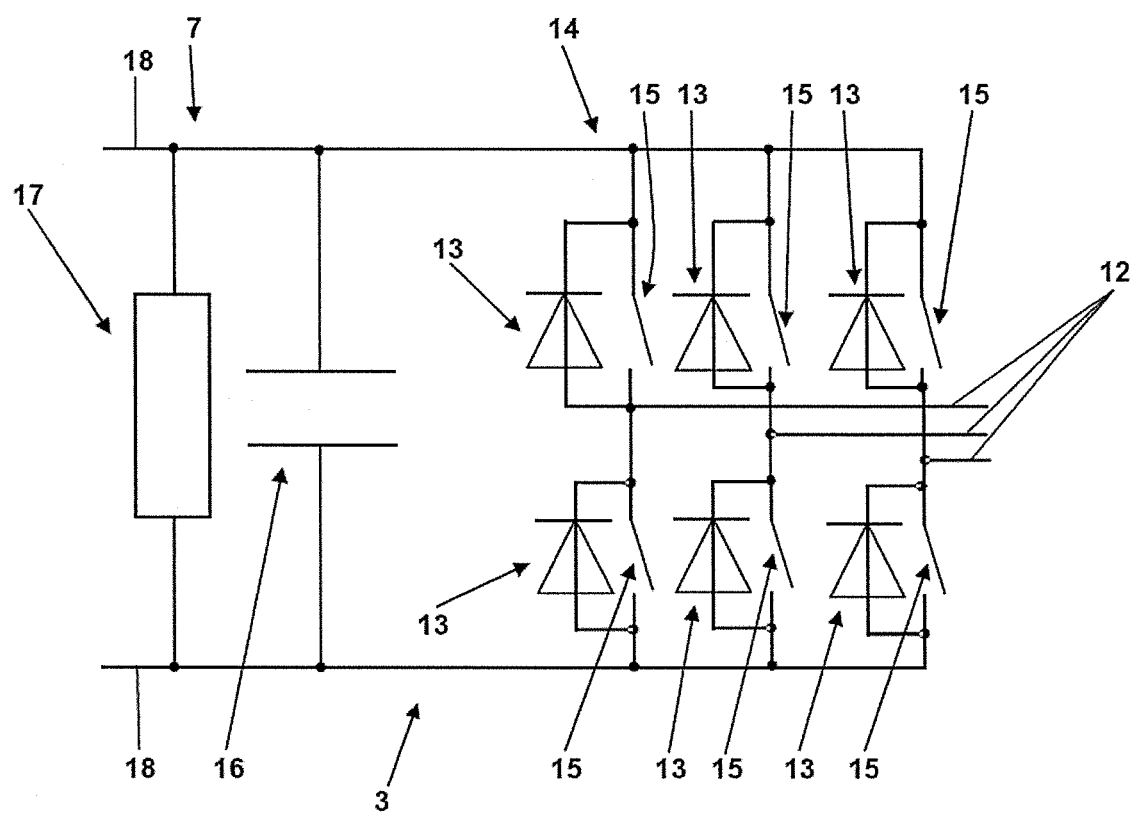
FIG. 3 illustrates an embodiment of the inverter of the apparatus according to FIG. 1.

At first, the auxiliary mains switch 10 is closed to connect the inverter 3 to the AC power grid 4 at S1. This has the result that an AC current flows from the AC power grid into the inverter 3. From FIG. 3 showing the interior configuration of the inverter 3 it becomes clear that this AC current, which is flowing through the output lines 12, is rectified by free-wheeling diodes 13 of an inverter bridge 14 of the inverter 3, which are each connected to one of the switches of the inverter bridge 14 in an anti-parallel manner, into a direct current flowing through the input lines 18. This direct current charges the capacitance 16 of the DC link 7 of the inverter 3 up to the peak voltage of the AC power grid at S2 of FIG. 2. The charging current flowing in this way is limited by the choke 11 from FIG. 1. This limitation is not necessary during the entire pre-charging process up to the peak voltage of the AC power grid. Rather, during this step of pre-charging, the mains switch 8 may already be closed and the auxiliary mains switch 10 may be opened. After this step of passively pre-charging the DC link 7 (S2), the inverter 3 is activated, i.e., a controller (not depicted here) clocks the switches 15 of the inverter at S3, but only after the voltage difference between the peak voltage of the AC power grid and the link voltage has been reduced by the step of passively pre-charging. The switches 15 are clocked in order to adjust the link voltage across the capacity 16 to a pre-set value that is above the peak voltage of the AC power grid 4. In this step S4 of actively pre-charging, the switches 15 of the inverter 3 together with the inductance of the EMC filter act as a boost converter. The switches 6 according to FIG. 1 are closed at S5 one after the other to connect the PV array 2 to the inverter 3 only when the pre-set value of the link voltage, which is in the order of a typical operation voltage for feeding electric energy from the PV array 2 into the AC power grid 4, is adjusted. This step of connecting is done disregarding any voltage difference between the open circuit voltage of the respective segment 5 of the PV array 2 and the link voltage that is continuously adjusted to the pre-set value at S6. However, this procedure of connecting the PV array 2 in a hard manner proves to be uncritical, since the charges flowing from the respective segments 5 into the link 7 are limited and, due to the size of the capacitance 16, merely result in a comparatively slow increase of the link voltage. This increase is at least slow enough, such that the voltage control unit of the inverter 3 can react sufficiently fast to an impending increase of the link voltage and compensate for it by appropriate clocking of the switches 15, i.e., by feeding current into the AC power grid. Thus, no excessive voltages across the inverter 3 occur despite connecting the PV array in a hard manner at an open circuit voltage that is by far above the pre-set value of the link voltage. If in exceptional cases the link voltage should still reach a critical value, the inverter 3 is blocked by opening the switches 15, and the switches 6 from FIG. 1 are opened again. The link voltage across the capacitance 16 then decreases by means of a de-charging device 17, which is depicted in FIG. 3 as a de-charging resistor. After that, a new attempt for connection can be made. The inverter 3, which is depicted here as a three-phase inverter, could as well be a single-phase inverter. As soon as the entire PV array is connected, the control unit for the link voltage may be allocated to adjust the link voltage to a variable value that is determined by MPP-tracking instead of by a fixed value at S7.

Many variations and modifications may be made to the preferred embodiments of the invention without departing substantially from the spirit and principles of the invention.

All such modifications and variations are intended to be included herein within the scope of the present invention, as defined by the following claims.

The invention claimed is:

1. A method of connecting a photovoltaic (PV) array to an AC power grid via an inverter including a DC link at its input side, the method comprising:
   pre-charging the input DC link of the inverter from the AC power grid;
   adjusting a link voltage of the DC link to a pre-set value by means of the inverter connected to the AC power grid, the pre-set value being lower than an open circuit voltage of the PV array; and
   connecting the PV array to the DC link, while executing the step of adjusting,
   wherein, in the step of connecting, the PV array at its open circuit voltage is directly connected to the DC link.

2. The method of claim 1, wherein, in the step of adjusting, the pre-set value that the link voltage is adjusted to is higher than a peak voltage of the AC power grid.

3. The method of claim 1, wherein the PV array is divided into segments, and wherein, in the step of connecting, the segments are connected to the DC link one after the other.

4. The method of claim 1, wherein, in the step of pre-charging, a charging current flowing from the AC power grid into the DC link is rectified by free-wheeling diodes of an inverter bridge of the inverter.

5. The method of claim 4, wherein, in the step of pre-charging, a choke for limiting a charging current is connected between the AC power grid and the inverter.

6. The method of claim 5, wherein the choke is connected selectively between the AC power grid and the inverter during a first part of the step of pre-charging.

7. The method of claim 4, wherein, in the step of pre-charging, a resistor for limiting a charging current is connected between the AC power grid and the inverter.

8. The method of claim 7, wherein the resistor is connected selectively between the AC power grid and the inverter during a first part of the step of pre-charging.

9. The method of claim 4, wherein, in the step of pre-charging, a transformer for transforming a charging current prior to being rectified is connected between the AC power grid and the inverter.

10. The method of claim 9, wherein the transformer is connected selectively between the AC power grid and the inverter during a part of the step of pre-charging.

11. The method of claim 1, wherein, after completing the step of connecting, the link voltage of the DC link is adjusted to a variable value that is determined by a maximum power point (MPP)-tracking.

12. An apparatus for feeding electric energy from a PV array into an AC power grid, the apparatus comprising:
   an inverter,
   a DC link coupled to an input side of the inverter,
   a voltage control unit for a link voltage of the DC link,
   at least one switch configured to connect the PV array to the DC link,
   at least one mains switch configured to connect the inverter to the AC power grid, and
   a connection controller configured to connect the PV array to the AC power grid via the inverter,
   wherein the connection controller is configured to first close the mains switch, then activate the voltage control unit for the link voltage to adjust the link voltage to a pre-set value that is lower than an open circuit voltage of the PV array, and afterwards close the at least one switch for connecting the PV array to the DC link, such that the PV array at its open circuit voltage is directly connected to the DC link, while the voltage control unit is adjusting the link voltage to the pre-set value.

13. The apparatus of claim 12, wherein the inverter comprises a plurality of switches in a bridge configuration, and wherein the plurality of switches of the inverter are designed for a lower permissible voltage than the open circuit voltage of the PV array.

14. The apparatus of claim 12, wherein the at least one switch configured to connect the PV array to the DC link comprises several switches, and further comprising several PV segment input terminals configured to connect the PV array to the DC link segment by segment.

15. The apparatus of claim 12, wherein the inverter comprises an inverter bridge with free-wheeling diodes configured to passively rectify a charging current from the AC power grid into the DC link.

16. The apparatus of claim 15, further comprising a choke configured to limit a charging current selectively connected in a current path between the inverter and the AC power grid.

17. The apparatus of claim 15, further comprising a resistor configured to limit a charging current selectively connected in a current path between the inverter and the AC power grid.

18. The apparatus of claim 15, further comprising a transformer configured to transform a charging current selectively connected in a current path between the inverter and the AC power grid.

* * * * *